United States Patent [19]
McGregor et al.

[11] Patent Number: 5,838,406
[45] Date of Patent: Nov. 17, 1998

[54] LIGHT REFLECTANT SURFACE OF EXPANDED POLYTETRAFLUOROETHYLENE WITH NODES AND FIBRILS FOR BACKLIT LIQUID CRYSTAL DISPLAYS

[75] Inventors: Gordon L. McGregor, Landenberg, Pa.; Raymond B. Minor, Elkton, Md.; Gregory E. Hannon, Newark, Del.

[73] Assignee: W. L. Gore & Associates, Inc., Newark, Del.

[21] Appl. No.: 520,633

[22] Filed: Aug. 29, 1995

[51] Int. Cl.$^6$ .......................... G02F 1/1335; G02B 5/12; G02B 5/02; F21V 7/00
[52] U.S. Cl. .......................... 349/113; 359/515; 359/599; 362/341
[58] Field of Search .......................... 362/341; 359/599, 359/515, 838; 428/311.1, 315.5; 349/113

[56] References Cited

U.S. PATENT DOCUMENTS

| | | | |
|---|---|---|---|
| 3,839,957 | 10/1974 | Deleuze et al. | 101/93 C |
| 3,953,566 | 4/1976 | Gore | 264/288 |

(List continued on next page.)

FOREIGN PATENT DOCUMENTS

| | | | |
|---|---|---|---|
| 0079045 | 5/1983 | European Pat. Off. | 349/113 |
| 0313263 | 4/1989 | European Pat. Off. | |
| 0372224 | 6/1990 | European Pat. Off. | |
| 0402901 | 12/1990 | European Pat. Off. | |
| 0496323 | 7/1992 | European Pat. Off. | 349/113 |
| 55032045 A (AB) | 3/1980 | Japan | |
| 58102218 A (AB) | 6/1983 | Japan | |
| 63104030 A (AB) | 5/1988 | Japan | |
| 6-148630 | 5/1994 | Japan | 349/113 |
| 96/21168 | 7/1996 | WIPO | |

OTHER PUBLICATIONS

Saunders et al, "Roughened Quartz Surfaces and Teflon as Small Angle Diffusers and Depolarizers between 200 and 400 nm," Applied Optics, vol. 28, No. 15, Aug. 1, 1989, pp. 3242–3245.

Weidner et al, "Reflection Properties of Pressed Polyterrafluoroethylene Powder," J. Opt. Soc. Am., vol. 71, No. 7 (Jul. 1981) pp. 856–861.

Patent Abstracts of Japan, for JP 7–235714 (Sep. 5, 1995).

Patent Abstrasts of Japan, vol. 4, No. 1 (Jan. 8, 1980), Abstract for JP54–141152 (Nov. 2, 1979).

Nutter et al, "Sintered Halon as a diffuse reflecting liner for light integration boxes," Nuclear Instruments and Methods in Physics Research A310, No. 3, (1991) 665–670.

Diffuse Reflectance coatings and Material, Labsphere ®, 1996 Catalog, pp. 32–43.

Detector Modules, IEEE Transactions on Nuclear Science, vol. 39, No. 4, Aug. 1992) pp. 1074–1078.

Bruegge et al, "Reflectance Stability Analysis of Spectralon Diffuse Calibration Panels," SPIE vol. 1493 Calibration of Passive Remote Observing Optical and Microwave Instrumentation (1991), pp. 132–142.

Springsteen, "A Novel Class of Lambertian Reflectance Materials for Remote Sensing Application," SPIE vol. 1109 Optical Radiation Measurmeents II (1989), pp. 133–141.

*Primary Examiner*—Anita Pellman Gross
*Attorney, Agent, or Firm*—David J. Johns

[57] ABSTRACT

The present invention is an improved material and method for use for providing diffuse reflectivity of light in backlighted visual displays, such as liquid crystal displays (LCD) employed in a wide variety of applications. By employing an expanded polytetrafluoroethylene (PTFE) comprising a microstructure of polymeric nodes and fibrils, the material of the present invention demonstrates exceptional diffuse reflectivity across a wide spectrum of visible light. Additionally, the material of the present invention provides many properties that have been previously unavailable in highly diffuse reflective material, including a high degree of malleability, moldability and flexibility, and effective reflectivity even at relatively thin cross-sections.

13 Claims, 7 Drawing Sheets

U.S. PATENT DOCUMENTS

| | | | |
|---|---|---|---|
| 3,962,153 | 6/1976 | Gore | 260/2.5 R |
| 3,968,639 | 7/1976 | Berets et al. | 58/23 R |
| 4,035,085 | 7/1977 | Seiner | 356/179 |
| 4,096,227 | 6/1978 | Gore | 264/210 R |
| 4,152,618 | 5/1979 | Abe et al. | 313/116 |
| 4,182,551 | 1/1980 | Washida et al. | 350/357 |
| 4,183,631 | 1/1980 | Kondo et al. | 350/357 |
| 4,187,390 | 2/1980 | Gore | 174/102 R |
| 4,264,150 | 4/1981 | Yano et al. | 350/357 |
| 4,354,741 | 10/1982 | Mano et al. | 350/357 |
| 4,463,045 | 7/1984 | Ahr et al. | 428/131 |
| 4,523,319 | 6/1985 | Pfost | 372/54 |
| 4,674,210 | 6/1987 | Baeger | 40/542 |
| 4,764,932 | 8/1988 | Peterson et al. | 372/34 |
| 4,772,124 | 9/1988 | Wooten et al. | 356/218 |
| 4,793,695 | 12/1988 | Wada et al. | 350/357 |
| 4,805,181 | 2/1989 | Gibson et al. | 372/72 |
| 4,902,423 | 2/1990 | Bacino | 210/500.36 |
| 4,912,720 | 3/1990 | Sprinsteen | 372/72 |
| 5,037,618 | 8/1991 | Hager | 422/186.03 |
| 5,102,921 | 4/1992 | Harada et al. | 521/134 |
| 5,110,527 | 5/1992 | Harada et al. | 264/127 |
| 5,116,115 | 5/1992 | Lange et al. | 351/212 |
| 5,241,180 | 8/1993 | Ishaque et al. | 250/361 R |
| 5,263,042 | 11/1993 | Kojima et al. | 372/72 |
| 5,293,546 | 3/1994 | Tadros et al. | 359/269 |
| 5,422,756 | 6/1995 | Weber | 359/487 |
| 5,462,705 | 10/1995 | Springsteen | 264/122 |
| 5,488,473 | 1/1996 | Springsteen et al. | 356/317 |
| 5,596,450 | 1/1997 | Hannon et al. | 359/599 |

LIGHT REFLECTANT SURFACE OF EXPANDED POLYTETRAFLUOROETHYLENE WITH NODES AND FIBRILS FOR BACKLIT LIQUID CRYSTAL DISPLAYS

BACKGROUND OF THE INVENTION

1. Field of the Invention

The present invention relates to surfaces used to reflect light, and particularly to highly light reflectant surfaces that provide even diffusion of light for the purpose of efficient uniform back lighting of visual displays.

2. Description of Related Art

Special light reflectant surfaces are used in a variety of applications requiring light energy to be close to completely reflected while providing an even distribution of light from the surface. While good mirrored surfaces can provide nearly perfect reflectivity of visible light, the light energy exiting these surfaces does so only at an angle equal to the incident angle of light contact. For many applications it is important that light be reflected with an even distribution of light from the surface. This latter property is referred to as diffuse or "lambertian" reflectance.

One such application where high diffuse reflectance is critical is in a backlight of a visual display (e.g., liquid crystal display), such as those used for military and avionic applications. These applications require both high brightness and image uniformity. The high brightness is required to enable readability in high sunlight environments that can be found in the cockpit of an aircraft. High level of image uniformity is required in most military vehicles, whether they be ground, air, or water vehicles, because of the critical nature of the information that is displayed. Typical critical information displayed on these devices include: warning or safety indicators, vehicular status information, navigational information, etc.

Typically, cathode ray tube (CRT) type displays have been utilized over many years for these applications. Among the advantages of CRT's are a high level of brightness and good color uniformity. Unfortunately, there are also various problems associated with using CRT's in these military and avionic applications. One major problem is in the reliability and limited ruggedness of such good devices. The shock and vibration associated with these applications often leads the CRT's to become out of adjustment and require a high level of maintenance. This problem compounds over time, which is particularly problematic in military and avionic applications where a vehicle may otherwise have a life cycle of 20 years or more. Additionally, CRT's typically are heavy and require a metal substructure for support and therefore contribute substantially to the weight of the aircraft.

Due to above mentioned problems with CRT's, liquid crystal display (LCD) technology has emerged into this market. Recent advancements in LCD technology has enabled these displays to meet the brightness and uniformity requirements. Typically, a sunlight readable display requires an LCD to have at least a luminance level of 685.2 candela/square meter (NIT) or 200 foot lamberts. In order to reach this luminance level, a backlight system is employed behind the LCD. Typically the LCD used for this market have a transmittance level of approximately 3–5%, therefore a backlight system must generate at least 13,704 candela/square meter (NIT) or 4000 foot lamberts.

Backlight systems capable of generating this high luminance level of 13,700 NITs or more also typically dissipate relatively high power levels thus causing detrimental heat to build up within the display module. In order to limit excess heat build-up, the efficiency of the backlight can be critical to minimize excess power dissipation. Efficiency can be equally important in conserving power usage of the displays.

The other important feature of this backlight system is to provide to the liquid crystal display module a uniform source of light. Within the industry there are different uniformity standards by which LCD's are measured. One subjective standard is based on a large area (e.g., center vs edge of the display) where a relatively high variance in luminance (e.g., up to 40%) is considered acceptable. Another standard that the LCD must meet is based on a smaller area such as 1 cm where even a 10% variance is considered unacceptable.

Meeting the uniformity standards with sunlight readable military displays is especially difficult. This is due to the typical setup of parallel or serpentine fluorescent lamps being placed directly behind the LCD module. The display area directly in front of the lamps appears much brighter than the display area directly in front of the gaps between the lamps (i.e., the lamps can create high luminance parallel stripes across the display that coincide with their position). This type of effect is highly objectionable.

Display uniformity can be significantly affected by the type of reflective material used in the backlight cavity. There are two basic categories of reflective materials: specular and diffuse. Specular reflection refers to a property where the reflection angle is equal to the angle of incidence (i.e., a "mirrored" surface). Contrastly, diffuse reflection refers a property where the reflected light is randomly scattered. The difference between these two properties depends upon the direction of the reflected light rather than the magnitude. In a backlight cavity, it is difficult to utilize a specular reflector without intricate reflector shapes to direct the reflected light so that the darkest areas (between the lamps and at the edges) are adequately illuminated. A diffuse reflector tends to scatter the light in all directions so that a planar sheet can achieve satisfactory illumination in these dark areas. Therefore, for a planar reflector the best illumination can be achieved when utilizing a material which is both highly reflective and diffuse so that the highest amount of light can illuminate dark areas.

Due to the many different applications that exist for reflectant materials, it is not surprising that there are many different commercially available products with a variety of diffuse reflective properties. Until the present invention, the highest reflectance material known with excellent diffuse reflectivity was that described in U.S. Pat. No. 4,912,720 and sold under the trademark SPECTRALON by Labsphere, Inc., North Sutton, N.H. This material comprises lightly packed granules of polytetrafluoroethylene that has a void volume of about 30 to 50% and is sintered into a relatively hard cohesive block so as to maintain such void volume. Using the techniques taught by U.S. Pat. No. 4,912,720, it is asserted that exceptionally high diffuse visible light reflectance characteristics can be achieved with this material, with reflectance over previously available reflectant material increasing from 97% to better than 99%.

Despite the reported advantages of SPECTRALON material, it is considered quite deficient in many respects. First, this material comprises a relatively hard block of material that must be carefully carved or machined to desired shapes and dimensions. This severely limits how and where this material can be used and greatly increases the cost of using this material in many applications, especially where single piece multi-sided cavities are desired. Therefore, where a pliable material is desired (such as with a military and avionic LCD where flexible material provides ease of installation), the SPECTRALON material plainly is inadequate. Furthermore, the additional machining process provides yet another source for contamination that can be detrimental to its reflective properties.

Second, the SPECTRALON material is apparently limited, both structurally and in its ability to reflect light, to a relatively thick minimum depth (i.e., a thickness of greater than 4 mm). Again, this serves to limit where and how this material can be used. Moreover, this limitation tends needlessly to increase both the amount of material required for a given application as well as the weight of the material required for such application.

Third, the SPECTRALON material is apparently relatively expensive to manufacture and purchase. These costs are only increased by the material's difficulty in processing into the final shape from the hard form (i.e., excessive amounts of material may have to be machined away and discarded during production) and its minimum thickness requirements. As a result, the SPECTRALON material is too expensive to be used in many applications that might otherwise benefit from its reflective properties.

Other materials currently used for coating reflective cavities are reflective paints or coatings based on barium sulfate, magnesium oxide, aluminum oxide, titanium oxide, and other white powders. One such example is Kodak White Reflectance coating No. 6080 which is available from Scientific Imaging Systems of Eastman Kodak Co., Rochester, N.Y. This coating is a specially prepared composition of barium sulfate, binder, and solvent. Despite good initial diffuse reflectance, this material maintains its reflectance properties for only a limited period of time (e.g., for only about six months) under normal atmospheric conditions. The material is expected to be stable for even shorter periods of time when exposed to high intensity ultraviolet radiation. Furthermore, application of this coating is extremely laborious requiring 4–8 coats to ensure an adequate thickness for best reflectance. Storage, preparation, and application of the material also requires special care. Even after all of the necessary steps for application, it still does not guarantee uniform results.

Accordingly, there is a distinct need for a highly diffuse reflective surface that can be easily handled and installed and provide other distinct advantages over existing reflective surfaces used in backlighted displays.

SUMMARY OF THE INVENTION

The present invention is an improved material and method for providing improved diffuse reflectivity of light in a backlight cavity of a visual display, such as liquid crystal displays. The present invention employs a reflectant material of expanded polytetrafluoroethylene (PTFE) comprising polymeric nodes interconnected by fibrils defining a microporous structure. It has been determined that this structure provides extremely high diffuse reflectivity, with significantly better than 95% reflectance of light provided. In fact, the material of the present invention has demonstrated higher diffuse reflectivity than the best diffuse reflective materials presently available.

Equally important, the material employed in the present invention demonstrates many other properties that make it particularly desirable for use as a reflectant material for backlight cavities of visual displays, especially in the cases where high uniformity and/or sunlight readability is desired such as in military and avionic instrumentation. First, the material is highly flexible, allowing a multiple sided cavity to be formed from a single piece. This property vastly reduces the effort which is currently necessary to fabricate, assemble, and align multiple separate pieces in order to form a multiple sided reflective surface. By reducing the seams which are inherent in a multiple piece product total reflectance can be further enhanced. Second, the material is easily diecut allowing the piece to be sized to the appropriate dimensions using clean and efficient methods. Third, the material used in the present invention demonstrates excellent reflectant properties even at relatively thin (e.g., <1 mm) thicknesses, making the material lighter, reducing material volume and less expensive to employ than presently available materials as well as lending its use to many applications not previously available. Lastly, the material of the present invention is very stable over time with respect to a wide range of environmental conditions making it ideally suitable for applications requiring stability over 20 years or more.

DESCRIPTION OF THE DRAWINGS

The operation of the present invention should become apparent from the following description when considered in conjunction with the accompanying drawings, in which.

DETAILED DESCRIPTION OF THE INVENTION

The present invention relates to surfaces used to reflect light, and particularly to highly light reflectant surfaces that provide even diffusion of light for the purpose of efficient uniform back lighting of visual displays. As the term "light" is used herein, it is intended to include any form of electromagnetic radiation, but especially that in the spectrum of visible light (400 to 700 nm wavelength) and through infrared (IR) light radiation (700 to greater than 2500 nm wavelength). For the present invention involving backlight cavities for visual displays the visible wavelengths are of the primary importance. It should be appreciated that the material of the present invention may be tailored to modify reflectance in particular bands of light energy through the use of coatings, fillers, or similar materials.

Figure 1:
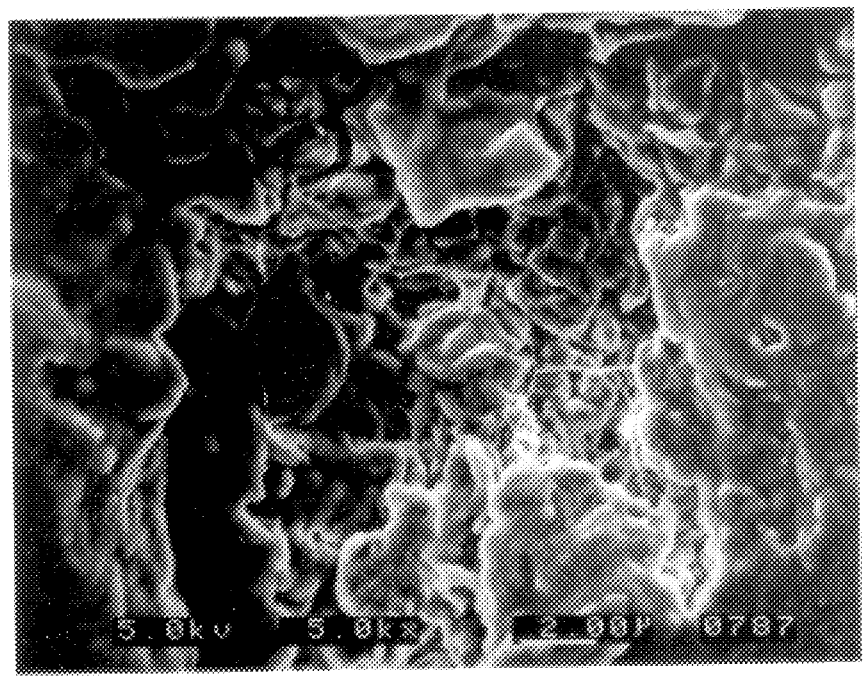
FIG. 1 is a scanning electron micrograph (SEM), enlarged 5000 times, showing the surface of a light reflectant material of a commercially available diffuse reflective material.

As has been explained, the best diffuse reflectant material commercially available today is that sold under the trademark SPECTRALON by Labsphere, Inc., of North Sutton, N.H. This material comprises a granular polytetrafluoroethylene material that is lightly packed and then molded into a rigid block. FIG. 1 is a scanning electron micrograph (SEM) of a surface of a ½ inch thick reflectant sheet of SPECTRALON material. While this material provides good reflectivity of visible and near IR light, providing up to about 99% diffuse, "lambertian," reflectance over portions of that spectrum of light, the material has a number of drawbacks that constrain its use. Among the perceived problems with this material are: difficulty in processing due to its rigidity, especially where non-planar reflectant surfaces are required; limited range of effective light reflectance across visible and IR light spectrum; relatively thick minimum thicknesses (i.e., its effective reflectance diminishes at thicknesses of less than about 4 mm); and less than optimum diffuse reflectivity. Despite these deficiencies, this material is considered the present standard by which the diffuse reflectivity of all other materials is measured.

Figure 2:
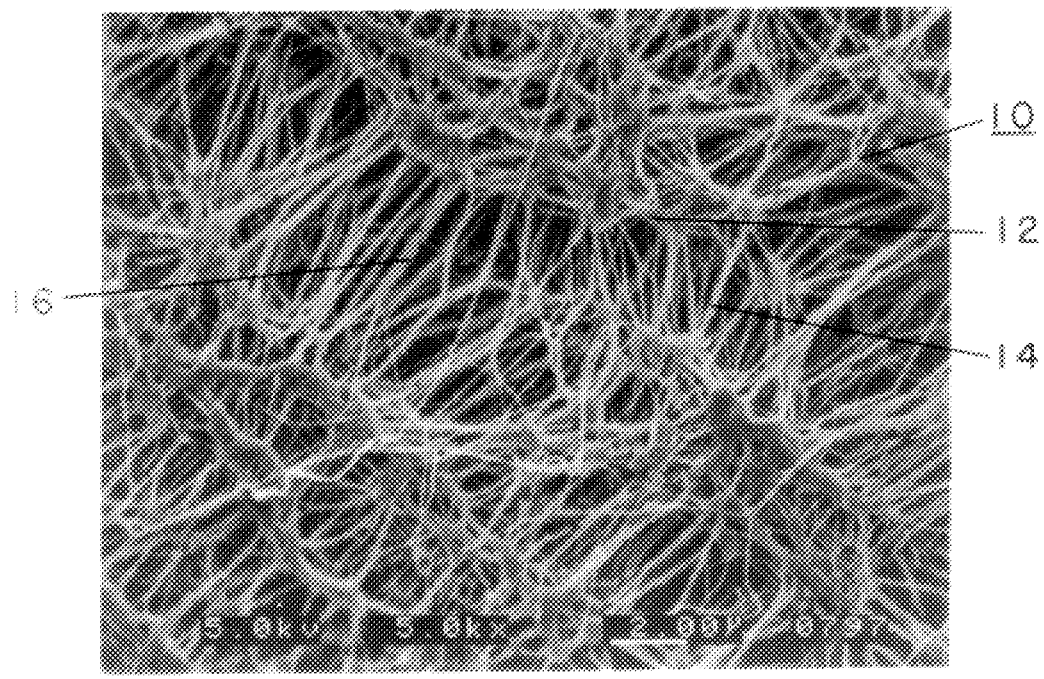
FIG. 2 is an SEM, enlarged 5000 times, showing the surface of one embodiment of a light reflectant material of the present invention.

The present invention employs a distinctly different material comprising an expanded polytetrafluoroethylene (PTFE), such as that made in accordance with U.S. Pat. Nos. 3,953,566, 3,962,153, 4,096,227, 4,187,390, and 4,902,423, all incorporated by reference. This expanded PTFE material comprises a microporous structure of microscopic polymeric fibrils (i.e., thread-like elements) interconnecting polymeric nodes (i.e., particles from which fibrils emerge). The structure of a biaxially expanded example of this material is shown in the SEM of FIG. 2. This material 10 comprises polymeric nodes 12 and numerous fibrils 14 extending from the nodes 12. As can be seen, numerous microporous voids 16 are provided within the material 10. As the term "expanded PTFE" is used herein, it is intended to include any PTFE material having a node and fibril structure, including in the range from a slightly expanded structure having fibrils extending from relatively large nodes of polymeric or other material, to an extremely expanded structure having fibrils merely intersect with one another at nodal points.

Expanded PTFE has a number of important properties that make it particularly suitable as a reflectant surface of the present invention. First, PTFE is a highly inert material that is hydrophobic. Accordingly, the material is resistant to both water and a wide variety of other materials that could damage some other reflectant surfaces. Additionally, by expanding PTFE in the manner taught by U.S. Pat. No. 3,953,566 to form the node and fibril structure, the material undergoes a significant increase in tensile strength and becomes highly flexible. Moreover, while packed granular based PTFE material provides good diffuse reflectant properties, it has been discovered that the node and fibril structure of expanded PTFE provides a much higher diffuse reflectance property.

A preferred reflectant material of the present invention is made in the following manner. A fine powder PTFE resin is blended with a lubricant, such as odorless mineral spirits, until a compound is formed. The volume of lubricant used should be sufficient to lubricate primary particles of the PTFE resin so as to minimize the potential of the shearing of the particles prior to extruding.

The compound is then compressed into a billet and extruded, such as through a ram type extruder, to form a coherent sheet of extrudate. A reduction ratio of about 30:1 to 300:1 may be used (i.e., reduction ratio=cross-sectional area of extrusion cylinder divided by the cross-sectional area of the extrusion die). For most applications a reduction ratio of 75:1 to 100:1 is preferred.

The lubricant may then be removed, such as through volatilization, and the dry coherent extrudate sheet is expanded rapidly in at least one direction about 1.1 to 50 times its original length (with about 1.5 to 2.5 times being preferred). Expansion may be accomplished by passing the dry coherent extrudate over a series of rotating heated rollers or heated plates at a temperature of between about 100° and 325° C., such as through the method taught in U.S. Pat. No. 3,953,566. Alternatively, the extruded sheet may be expanded in the manner described in U.S. Pat. No. 4,902,423 to Bacino, prior to removal of the lubricant.

In either case, the material may be further expanded at a ratio of 1:1.1 to 50:1 (with 5:1 to 35:1 being preferred) to form a final microporous sheet. Preferably the sheet is biaxially or multi-axially expanded so as to increase its strength in both its longitudinal and transverse directions. Finally, the material may be subjected to an amorphous locking step by exposing it to a temperature in excess of 340° C.

The material of the present invention is preferably made in the form of sheets, which, due to their inherent flexibility, may be formed into a wide variety of other shapes as desired, such as tubes, strips, convex or concave structures, etc. Additionally, to address particular applications, the material of the present invention may likewise be extruded or otherwise formed into continuous tubes, rods (i.e., cylinders), rectangles, uneven shapes and other structures that may be of interest.

Sheets made from the above processing steps can be produced in thicknesses ranging from, but not limited to, 0.01 mm to 12 mm. Sheets can be subsequently layered upon themselves and subjected to temperatures ranging from about 300° C. to 400° C. while applying sufficient pressures to bond the layers together.

Figure 3:
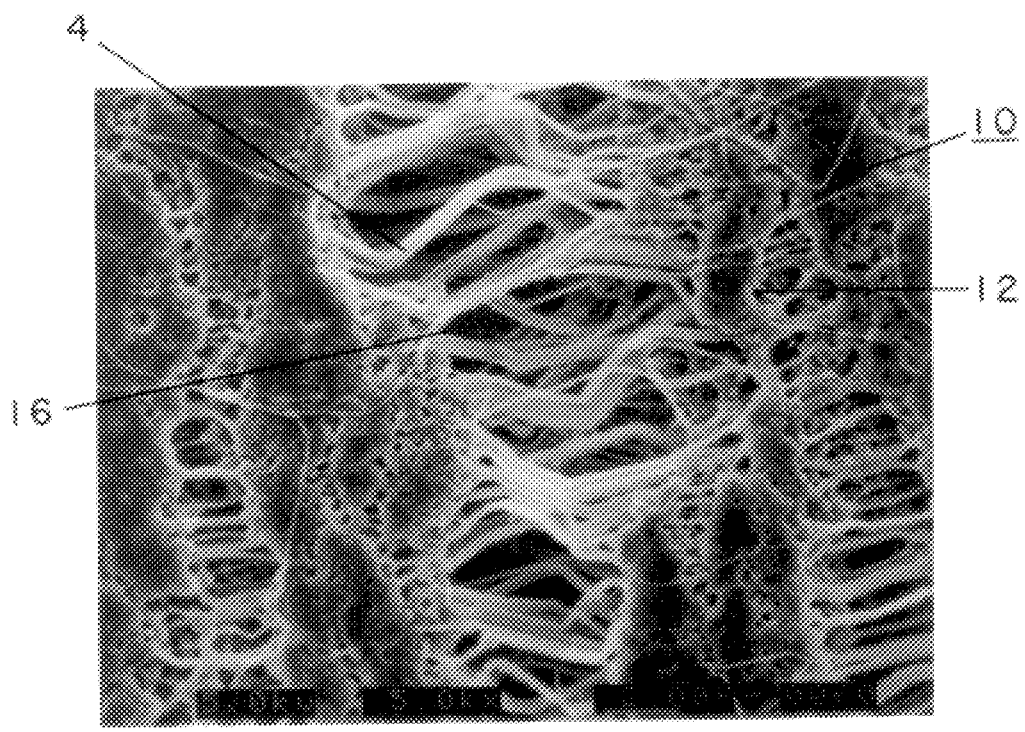
FIG. 3 is an SEM, enlarged 5000 times, showing the surface of other embodiment of a light reflectant material of the present invention.

It has been determined that by providing a microporous surface of polymeric nodes and fibrils, such as that of expanded PTFE, and particularly one that has been expanded in more than one direction, light is reflected off the node and fibril structure at a very high efficiency rate, with very even diffuse dispersion (i.e., diffusion) of the light. The SEM of FIG. 2 shows expanded PTFE material 10 that has undergone extensive expansion in two different directions. This structure exhibits a relatively "fine" structure with fibrils 14 oriented in both x and y directions, and small nodes 12 where the fibrils intersect. Still another embodiment of the present invention is shown in the SEM of FIG. 3. In this case, the expanded PTFE has been expanded in only the longitudinal direction. In this example there is a "coarser" structure characterized by larger nodes 12 and thicker fibrils 14. The fibrils 14 are oriented predominantly in a longitudinal direction.

As is explained in greater detail below, the present invention demonstrates extremely high diffuse reflectivity. When compared to the present reflectant standard of SPECTRALON material, the reflectant material of the present invention exhibited substantially higher diffuse reflectivity. Moreover, the reflectivity of the material of the present invention proved to have a number of other dramatically improved properties over the present standard. First, the reflectivity of the material remains high across a much wider spectrum of light wavelengths. Second, the material of the present invention demonstrates exceptional reflectivity even at much thinner profiles as compared with the existing standard material. Third, the material exhibits a very predictable, flat-line reflective response across a wide spectrum of light.

Figure 4:
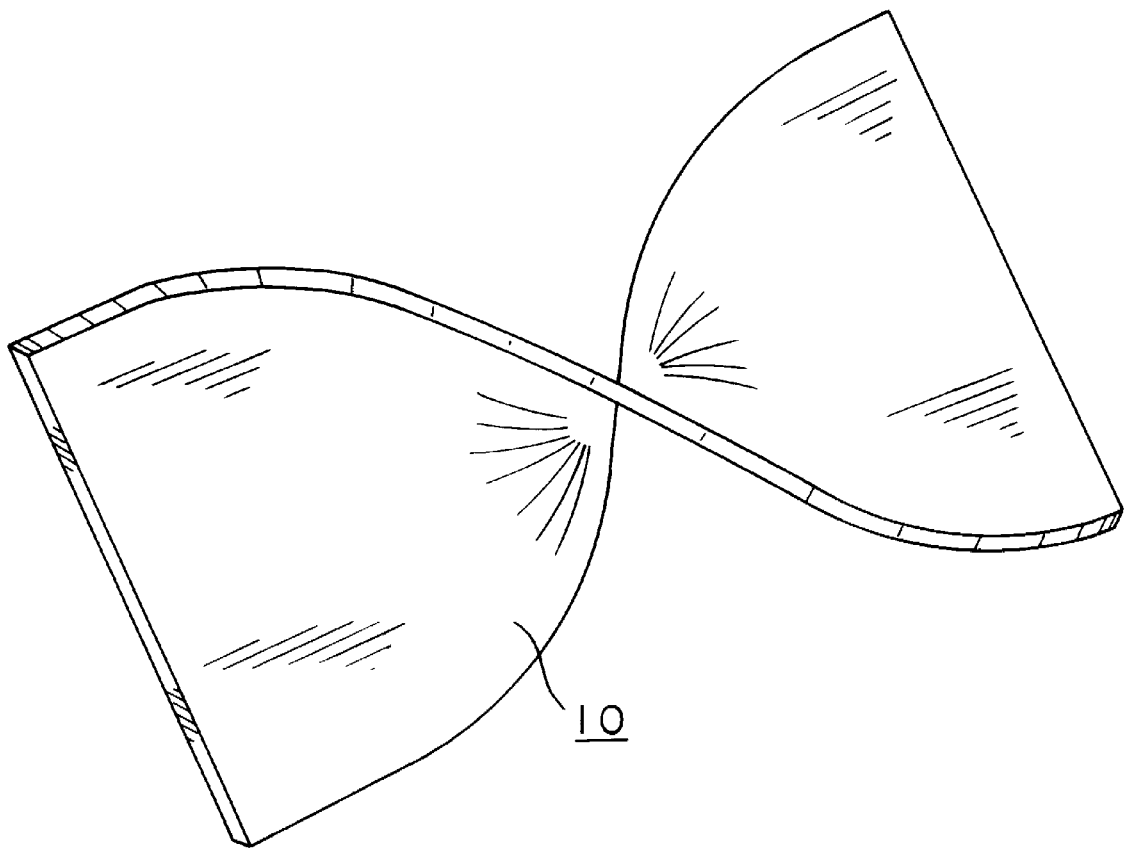
FIG. 4 is a three-quarter isometric view of a reflectant material of the present invention, wherein the flexibility of the material is demonstrated.

Another important improvement of the present invention is shown in FIG. 4. The reflectant material 10 of the present invention is highly malleable, moldable, and flexible, allowing it to be bent, twisted, curved, or otherwise formed into any suitable shape. In this respect, the reflectant material of the present invention is a dramatic improvement over previously available highly reflectant materials, such as SPECTRALON polytetrafluoroethylene reflectant materials that must be carved or machined into desired shapes. With the material of the present invention, a host of different non-planar shapes can be formed with minimal effort. These types of thin, flexible, formable materials having at least 95% and even 90% reflectivity should have great value for a range of backlight configurations. The luminance output is dependent on many factors such as bulb wattage, number of bulbs, cavity design, etc. and careful consideration can be given to determine the level of reflectance required by the reflector. For this reason it may be desirable to select a reflector with a reflectance at an increment between 95% and 99% such as but not limited to 96%, 97%, or 98%.

It should also be noted that the material of the present invention may be modified through processing or additional fillers and/or coatings to provide high reflectance in one range of the light spectrum and absorbance in another range of the spectrum. For most backlight applications it is believed desirable to provide a material with a reflectivity of at least 90% over a range of 400 to 700 nm.

The present invention may comprise single or multiple layers of expanded PTFE, or may comprise a laminate of one or more layers of expanded PTFE and a backing support material. Since the expanded PTFE membrane alone tends to be susceptible to stretching and distortion, for some applications it may be preferred that the membrane be mounted to a support layer, such as through lamination to a flexible woven or non-woven material, that will help maintain the shape of the image layer during use. One suitable support layer is applied by applying an adhesive material, such as moisture curable polyurethane or solvated polyurethane, to the expanded PTFE membrane and then applying the adhesive-coated expanded PTFE membrane to a flexible backing material (e.g., polyester, polypropylene, MYLAR®, KEVLAR®, nylon, etc.). The two materials can then be bonded to each other under applied pressure, such as by rolling the material between one or more pairs of nip rollers. With use of a moisture curable polyurethane adhesive to bond an expanded PTFE membrane to a woven fabric, such as nylon. The application of a pressure of about 1150 g per linear meter is sufficient to bond the materials together. The materials are then allowed to moisture cure for a period of about 48 hours before use.

In addition, to create complex shapes, an expanded PTFE sheet can be bonded to a rigid support material and then formed as a composite into shapes, such as parabolic or ellipsoidal domes. One suitable method for such forming techniques comprises using vacuum forming devices.

Without intending to limit the scope of the present invention, the following examples illustrate how the present invention may be made and used:

EXAMPLE 1

A reflectant material of the present invention was prepared in the following manner:

A fine powder PTFE resin was combined in a blender with odorless mineral spirits (ISOPAR K available from Exxon Corp.) until a compound was obtained. The volume of mineral spirits used per gram of fine powder PTFE resin was 0.275 cc/gm. The compound was compressed into a billet and extruded through a 1.14 mm gap die attached to a ram type extruder to form a coherent extrudate. A reduction ratio of 47:1 was used.

Subsequently, the odorless mineral spirit was volatized and removed, and the dry coherent extrudate was expanded unaxially in the longitudinal direction 4.0 times its original length by passing the dry coherent extrudate over a series of rotating heated rollers at a temperature of 300° C. The sheet was subsequently subjected to an amorphous locking step by passing the sheet over a series of rotating heated rollers at a temperature of 385° C. such that the material was in contact with the rollers for about 12 seconds.

This material formed a relatively course expanded structure such as that shown in FIG. 3.

EXAMPLE 2

Another sheet of the present invention was produced in the same manner as Example 1 except for the following differences:

The volume of mineral spirits used per gram of fine powder PTFE resin was 0.297 cc/gm. The compound was compressed into a billet and extruded through a 1.52 mm gap die attached to a ram type extruder to form a coherent extrudate. A reduction ratio of 70:1 was used.

Subsequently, the odorless mineral spirit was volatized and removed. Three layers of the dry coherent extrudate were then stacked and expanded unaxially in the longitudinal direction 4.6 times its original length by passing the dry coherent extrudate over a series of rotating heated rollers at a temperature of 310° C. The sheet was subsequently subjected to an amorphous locking step by passing the sheet over a series of rotating heated rollers at a temperature of 385° C. for about 40 seconds.

Again, this material formed a relatively course expanded structure such as that shown in FIG. 3.

EXAMPLE 3

A sheet of the present invention was produced in the following manner:

A fine powder PTFE resin was combined with an odorless mineral spirit. The volume of mineral spirits used per gram of fine powder PTFE resin was 0.275 cc/gm. This mixture is aged below room temperature to allow for the mineral spirits to become uniformly distributed within the PTFE fine powder resin. This mixture was compressed into a billet and extruded at approximately 8300 kPa through a 0.71 mm gap die attached to a ram type extruder to form a coherent extrudate. A reduction ratio of 75:1 was used.

The extrudate is then rolled down between two metal rolls which were heated to between 30°–40° C. The final thickness after roll down was 0.20 mm. The material was transversely expanded at a ratio of 3:1 and then the mineral spirits were removed from the extrudate by heating the mass to 240° C. (i.e., a temperature where the mineral spirits were highly volatile). The dried extrudate was transversely expanded at 150° C. at a ratio of 3.5:1. After expansion, the sheet was amorphously locked at greater than 340° C. and cooled to room temperature. This material forms a relatively fine expanded structure such as that shown in FIG. 2.

Multiple layers of this sheet material can then be stacked, placed under pressure, and exposed to a temperature of about 360° C. for about 30 minutes to bond the layers into a cohesive sheet of virtually any desired thickness.

EXAMPLE 4

Layered expanded PTFE material similar to that described in Example 3 above is commercially available from W. L. Gore & Associates, Inc., Elkton, Md., as a sheet gasket material under the trademark GORE-TEX GR® sheet gasketing. This material is available in different thicknesses (i.e., constituting different number of layers formed into cohesive sheets). In order to test the effectiveness of the material of the present invention as compared to commercially available light reflectant materials, various samples of sheet gasketing material were tested as follows:

Sample 1: A composite sheet comprising about 15 layers of expanded PTFE sheets with the following properties:

| Thickness: | 0.5 mm |
|---|---|
| Density: | 0.60 g/cc |

Sample 2: A composite sheet comprising about 25 layers of expanded PTFE sheets with the following properties:

| Thickness: | 1.0 mm |
|---|---|
| Density: | 0.57 g/cc |

Sample 3: A composite sheet comprising about 60 layers of expanded PTFE sheets with the following properties:

| Thickness: | 2.2 mm |
|---|---|
| Density: | 0.61 g/cc |

Sample 4: A composite sheet comprising about 85 layers of expanded PTFE sheets with the following properties:

| Thickness: | 3.4 mm |
|---|---|
| Density: | 0.59 g/cc |

Sample 5: A composite sheet comprising about 150 layers of expanded PTFE sheets with the following properties:

| Thickness: | 6.2 mm |
|---|---|
| Density: | 0.51 g/cc |

Additionally, material similar to that described in Examples 1 and 2, above, is commercially available from W. L. Gore & Associates, Inc., as a gasket tape under the trademark GORE-TEX® gasket tape. Again, this material is available in different thicknesses. Samples of this material were tested as follows:

Sample 6: A gasket tape comprising a single layer of relatively course expanded PTFE with the following properties:

| Thickness: | 1.0 mm |
|---|---|
| Density: | 0.50 g/cc |

Sample 7: A gasket tape comprising a single layer of relatively course expanded PTFE with the following properties:

| Thickness: | 3.3 mm |
|---|---|
| Density: | 0.66 g/cc |

Each of Samples 1 through 7 were tested in the following manner to quantify their reflective properties:

A 2 inch by 2 inch swatch from each of Samples 1 through 7 was placed in a CARY 5E Spectrophotometer with a Labsphere integrating sphere. The spectral range measured was 175 nm to 2500 nm. Data below 250 nm was not reported due to the unreliability of the standard material below this value. All measurements were made in the double-beam mode with the same working standard in the sphere's reference reflectance port. The reflectance standard used was of SPECTRALON material, Labsphere Serial Number SRS-99-010-8111-A. Photomultiplier detection was used below 800 nm and lead sulfide detection was used above 800 nm. All measurements were normalized with respect to the baseline of the system. This data is then corrected by multiplying it by the correction factors supplied with the reflectance standard. This data was then averaged and plotted.

Figure 5:
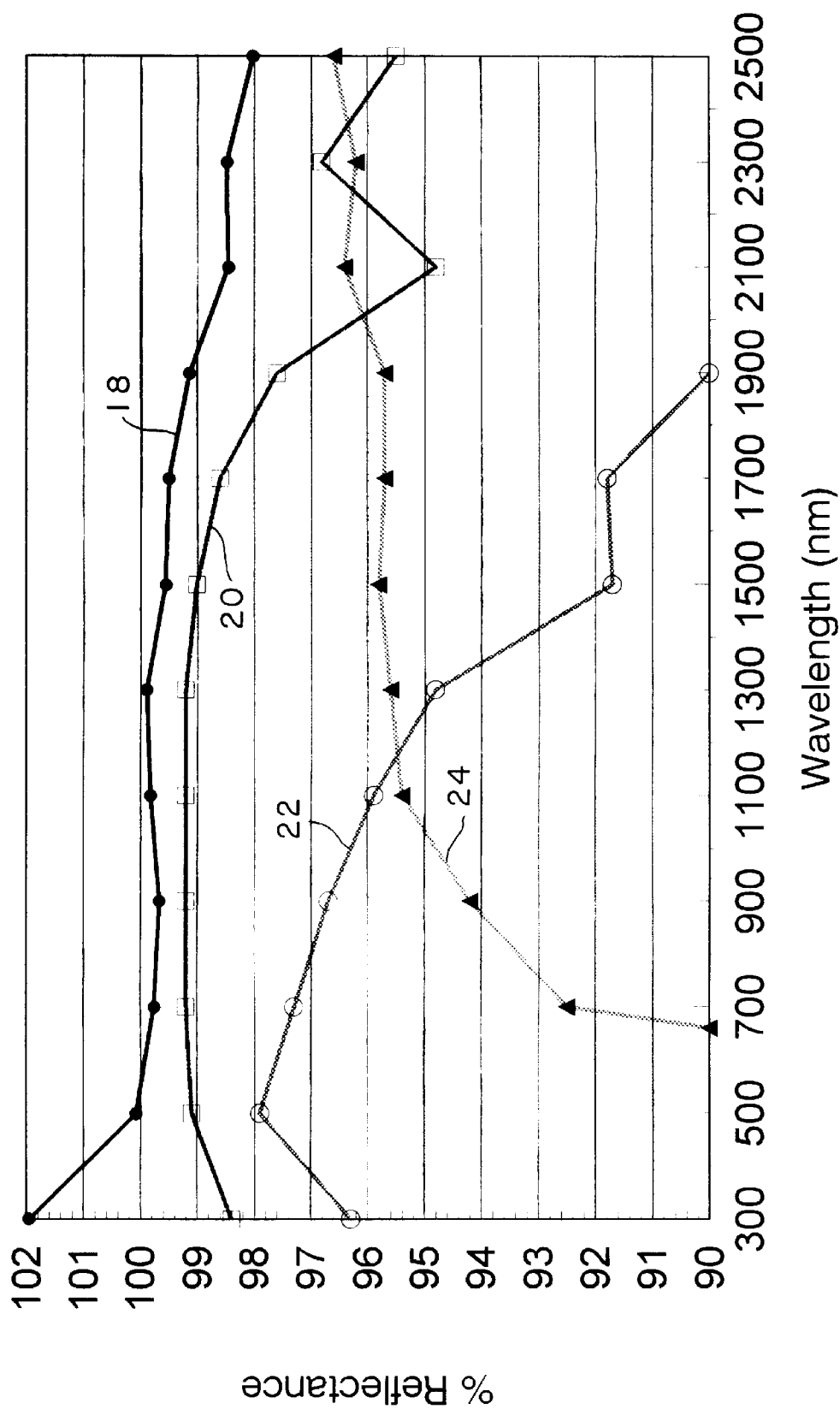
FIG. 5 is a graph plotting the reflectance verses wavelength of a reflectant material of the present invention as compared to commercially available materials.

The graph of FIG. 5 records the reflectance verses light wavelength of one sample of the present invention as compared with three commercially available reflectant materials. Line 18 is the performance of the material of Sample 5 of the present invention as compared with commercially available reflectant materials SPECTRALON (Line 20), SPECTRAFLECT (Line 22), and INFRAGOLD (Line 24), each available from Labsphere, Inc., North Sutton, N.H. These materials are represented by their manufacturer to be some of the highest diffuse reflectant materials available. The data plotted for the commercially available materials was obtained from the technical information catalog published by Labsphere, Inc. As can be seen, at all wavelengths of light tested, the reflectant material of the present invention demonstrated markedly higher reflectivity than the commercially available reflectant materials. Additionally, the material of the present invention retained its reflective properties into much higher wavelengths than the commercial materials.

It should be noted here that the reflectivity numbers reported herein are not asserted to show better than complete reflectance of light, but, rather, as demonstrating significantly better reflectance than the present state-of-the-art SPECTRALON reflectant material used as a standard.

Figure 6:
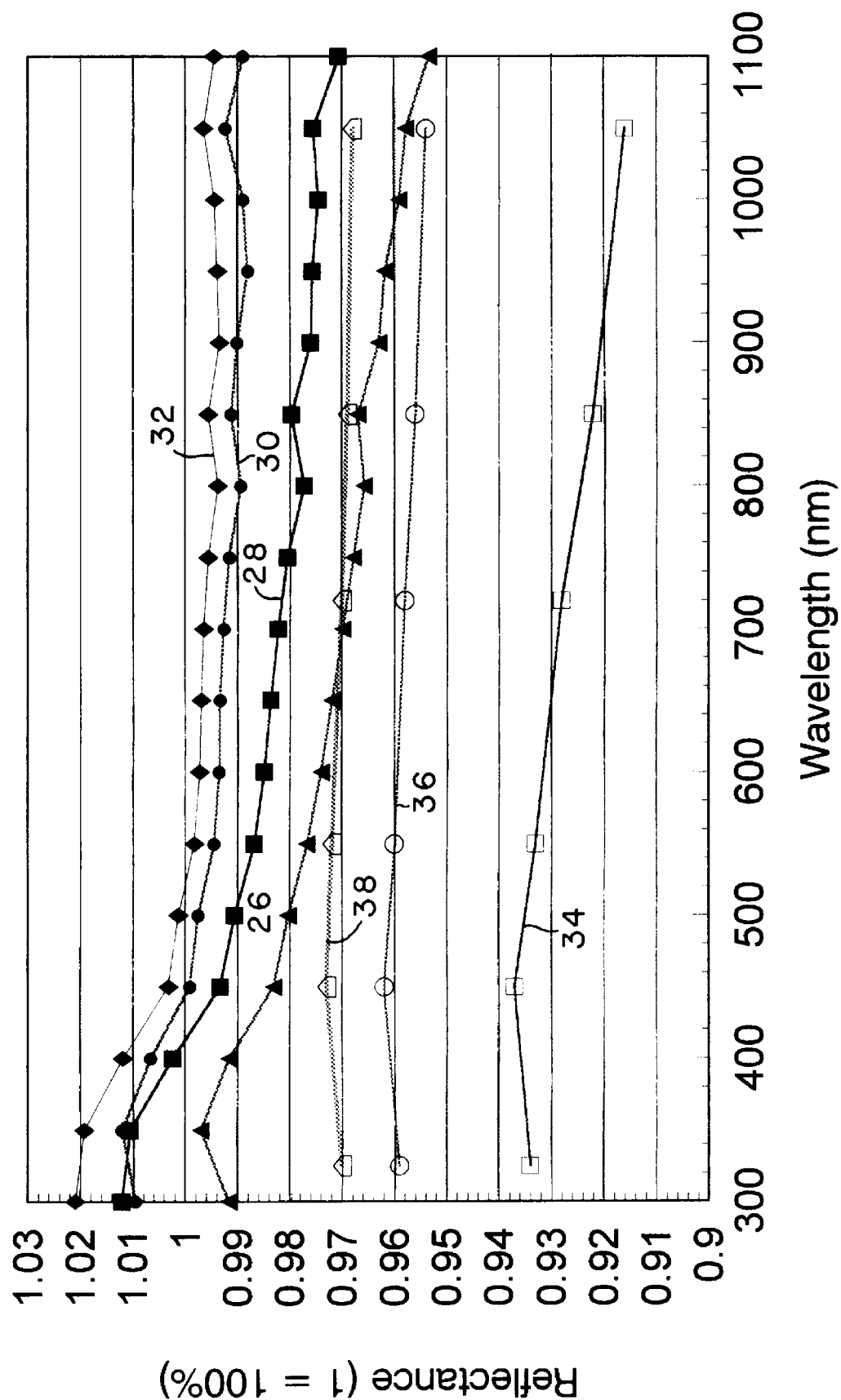
FIG. 6 is a graph plotting the reflectance verses wavelength of varying thicknesses of the reflectant material of the present invention as compared to commercially available materials.

The graph of FIG. 6 records the reflectance verses light wavelength of different thicknesses of inventive material compared to similar thicknesses of SPECTRALON reflective material. Lines 26, 28, 30, and 32 respectively represent the performance of Samples 1, 2, 3, and 4 of the present invention. By way of comparison, lines 34, 36, and 38 respectively represent the performance of 1.0 mm, 2.0 mm, and 3.0 mm thick samples of SPECTRALON material according to published data from the technical catalog of Labsphere, Inc. Sample 1 was included here even though information is not available for SPECTRALON material at a thickness of 0.5 mm. In all cases the inventive material was substantially higher in reflectivity than SPECTRALON reflectant material of similar thickness. This difference appears to be even more pronounced as the materials decrease in thickness. It should be noted that the 0.5 mm material of the present invention, even though six times thinner than the 3.0 mm SPECTRALON material, demonstrates equal to or higher reflectivity within the visible wavelengths of 400 to 700 nanometers.

Figure 7:
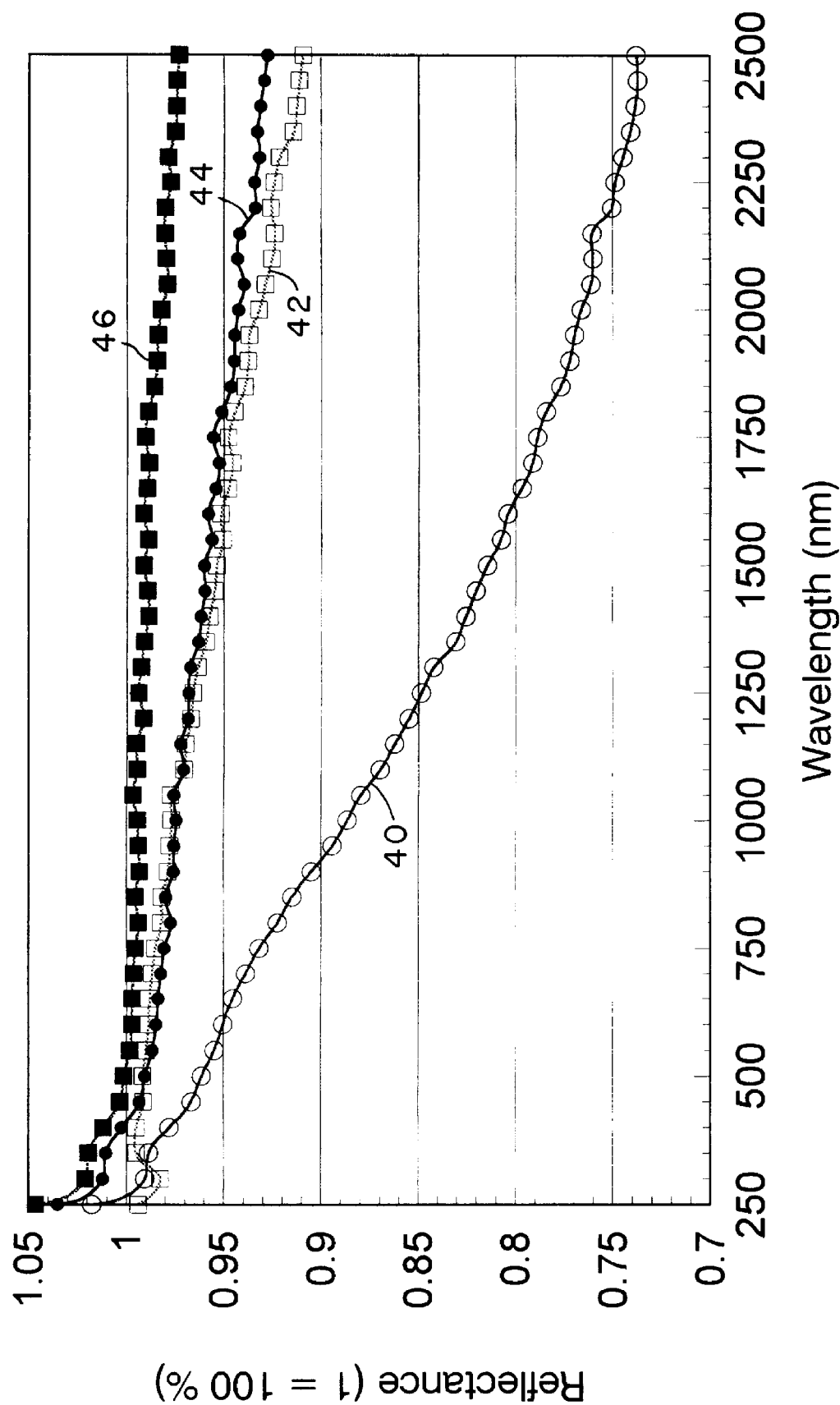
FIG. 7 is a graph plotting the reflectance verses wavelength of various structures of embodiments of the reflectant materials of the present invention.

The graph of FIG. 7 records the reflectance verses light wavelength of four samples with similar densities of expanded PTFE material of the present invention. Of the four samples, there are two different thickness levels represented, with a coarse and fine structure material at each level. Lines 40 and 42 represent Samples 6 and 7, respectively, each with a relatively coarse structure characterized by large nodes and thick fibrils. Lines 44 and 46 represent Samples 2 and 4, respectively, each having a relatively fine structure characterized by small nodes and fine fibrils.

In like thickness comparisons, the finer structure material demonstrated much higher reflectivity than the coarser structure material at all wavelengths tested. For instance, Sample 2 with a thickness of 1.0 mm was substantially more reflective than Sample 6 with the same thickness of 1.0 mm.

The above Examples demonstrate that the reflectant material of the present invention performs far better and more consistently as a diffuse reflectant material over a wider spectrum of light than the best diffuse reflectant material presently commercially available.

In the preferred embodiment of the present invention, the superior reflectant properties (especially in the visible wavelengths) of the inventive material offer significant advantages as reflectors for backlight cavities used with liquid crystal displays. Backlight cavity is meant to describe the enclosure that surrounds the space in which the backlight lamps are housed. The volume of space is typically located directly behind the liquid crystal module. This light cavity provides the luminance required to view the liquid crystal display for these applications. Within the military and avionic industry, active matrix liquid crystal displays are becoming the preferred choice over passive matrix liquid crystal displays due to the increased video addressing speed, depth of color, and wider viewing angle inherent in the active matrix displays. These displays typically have less light transmission bringing about the need to have higher backlight luminance. This requirement for higher backlight luminance has increased the need for a highly efficient backlight reflective material.

Figure 8:
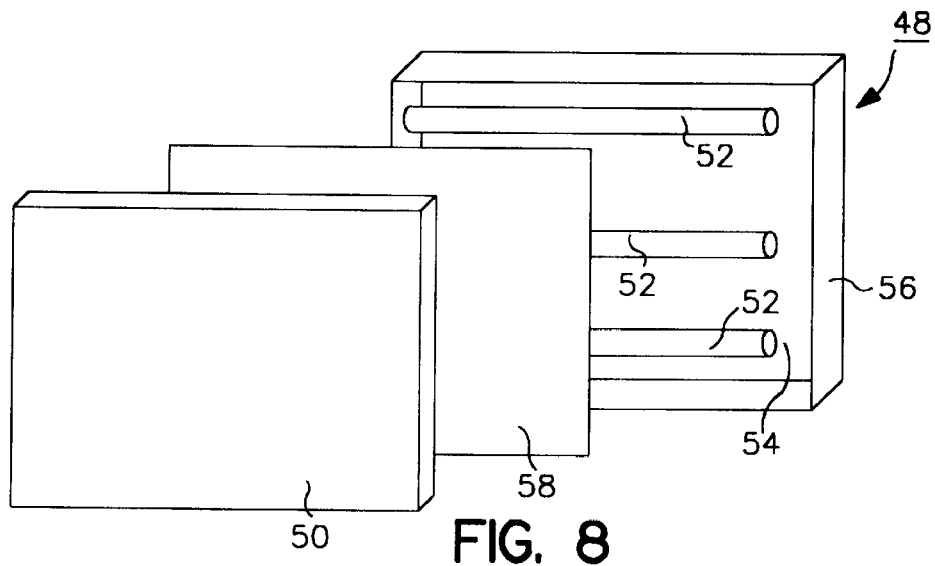
FIG. 8 is a three-quarter isometric view depicting a typical backlit liquid crystal display module.

FIG. 8 depicts an exploded view of a typical backlit liquid crystal display assembly 48. The main component of the assembly is the liquid crystal module 50 that transmits light therethrough. This component typically includes the liquid crystal, thin film transistors for activating the crystal, polarizers for collimating the light, color filters for each pixel, as well as other films for light orientation. The liquid crystal display module receives light from the lamps 52, reflected off of a backlight reflector 54 housed within the backlight cavity 56. This light is then diffused and therefore made more uniform by the diffuser 58. This light then enters the liquid crystal display module 50 where it then is regulated to form the display image. It is known to incorporate various other light enhancement films which can further modify brightness, viewing angle, etc.

Previous backlight cavities comprise a rigid reflector cut or machined (into multiple pieces) prior to assembly into a backlight. Typically this construction entails producing five (5) separate pieces, one backwall and four sidewalls, that must be positioned and joined together in the display.

Figure 9:
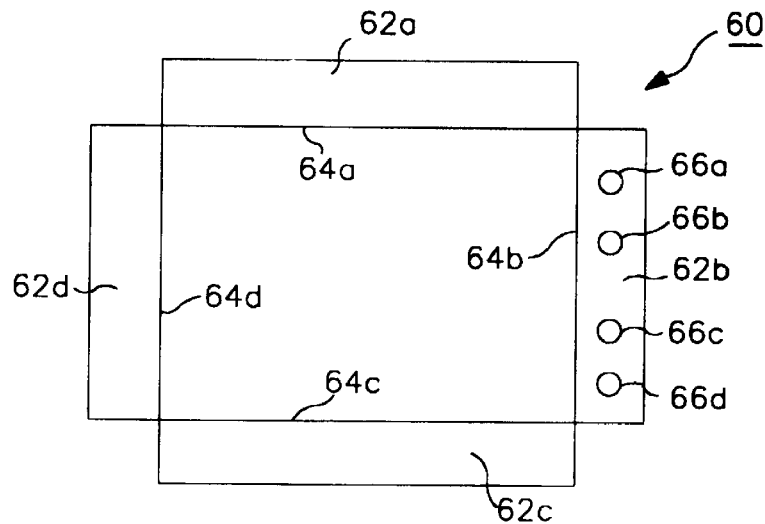
FIG. 9 is a plan view of the reflectant material of the present invention shown in an unfolded die-cut shape.

By contrast, FIG. 9 depicts the reflectant material 60 of the present invention as fabricated prior to installation in a backlight cavity. This material can be easily proportioned and sized through virtually any suitable method since the material is relatively easily cut and is very easily handled (such as being easily conformable). Cutting can be accomplished through a variety of standard methods such as cutting with a blade, die-cutting, laser cutting, waterjet cutting, etc.

As shown in FIG. 9, this material has been cut so that four sides 62a, 62b, 62c, 62d can be folded along the dotted fold lines 64a, 64b, 64c, 64d, respectively, to create a five sided box. Openings 66a, 66b, 66c, 6d may be readily provided in this material to readily accommodate light fixtures, protruding elements of the display casing, etc.

Figure 10:
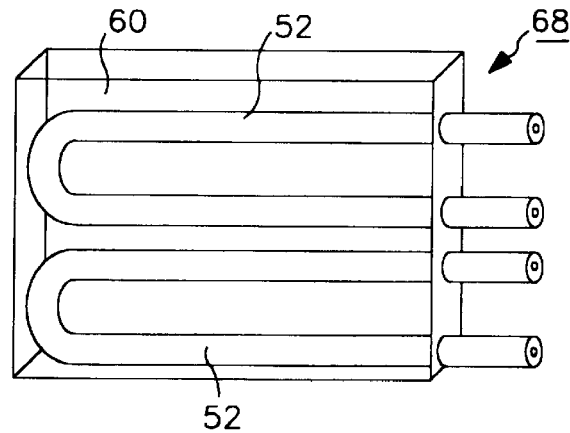
FIG. 10 is a three-quarter isometric view of the reflectant material of the present invention installed in a backlight cavity.

FIG. 10 shows final form of the folded assembly in an installation. In the embodiment shown, multiple light fixtures 52 are provided. Light from the light fixtures 52 reflects off the inventive reflective material 60 and through the diffuser and light transmitting liquid crystal display. Depending upon the design requirements, the reflectant material 60 of the present invention can stand alone or line a metal, polymer, or other housing. The attachment of the material to the housing can be accomplished through mechanical or adhesive means. As can be seen, the lamps typically project through precut openings in the material.

As can be appreciated from the description, rigid reflectors, such as SPECTRALON, installed in this type of configuration, would necessitate the costly fabrication of five separate pieces prior to assembly. These five separate pieces create additional difficulty in assembly plus the connecting seams can contribute to undesirable loss of light. Thus, the present invention provides distinct advantages in easier formation, fewer fabricated parts, easier assembly and installation, and fewer light reducing seams. Moreover, the material of the present invention provides even higher diffuse reflectivity than any other diffuser reflective material commercially available today.

As indicated previously, the military and avionic instrumentation product life cycle is desired to be 20 years or more. Unlike many other polymeric materials, PTFE has been shown to be unusually stable with respect to UV degradation. Many polymeric materials absorb certain wavelengths of UV radiation which cause the material to degrade and turn yellow in color. It should be evident that a material used for reflecting light in these applications must not degrade or change color. Furthermore, it is well documented that PTFE has an operating range of at least −268° C. to 288° C. enabling it to easily operate within a typical military or avionic environment of −55° C. to 150° C. Therefore, based on all of the above mentioned superior properties of the inventive material, it has been shown to offer features and benefits never before available for these applications.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A backlighted visual display comprising
   at least one sheet of expanded polytetrafluoroethylene (PTFE) comprising a structure of nodes and fibrils, the sheet being conformable;
   at least one light fixture mounted in the display;
   a light transmitting screen;
   the at least one sheet of expanded PTFE being mounted in the display so as to provide a high diffuse reflectivity of light from the light fixture through the screen.

2. The visual display of claim 1 wherein the expanded PTFE comprises multiple sheets of expanded PTFE layered to form a total sheet thickness of less than 3 mm.

3. The visual display of claim 2 wherein the total sheet thickness is less than 0.5 mm.

4. The visual display of claim 1 wherein greater than 90% of the visible light contacting the surface of the expanded PTFE is reflected off the surface.

5. The visual display of claim 4 wherein greater than 95% of the visible light contacting the surface of the expanded PTFE is reflected off the surface.

6. The visual display of claim 1 wherein the at least one sheet of expanded PTFE material comprises a thickness of less than 0.5 mm.

7. The visual display of claim 1 wherein
greater than 95% of the visible light contacting the surface of the expanded PTFE is reflected off the surface; and
the at least one sheet of expanded PTFE material comprises a thickness of less than 3 mm.

8. The visual display of claim 7 wherein the at least one sheet of expanded PTFE material comprises a thickness of less than 0.5 mm.

9. The visual display of claim 1 wherein the backlighted visual display comprises a liquid crystal display.

10. The visual display of claim 1 wherein the at least one sheet forms a non-planar reflective surface.

11. The visual display of claim 1 wherein greater than 96% of the visible light contacting the surface of the expanded PTFE is reflected off the surface.

12. The visual display of claim 1 wherein greater than 97% of the visible light contacting the surface of the expanded PTFE is reflected off the surface.

13. The visible display of claim 1 wherein greater than 98% of the visible light contacting the surface of the expanded PTFE is reflected off the surface.

* * * * *